United States Patent [19]

Fumeron

[11] 4,247,856

[45] Jan. 27, 1981

[54] SEQUENTIALLY SCANNED PLASMA DISPLAY FOR ALPHANUMERIC CHARACTERS

[75] Inventor: Joël Fumeron, Saint-Ouen, France

[73] Assignee: Compagnie Internationale pour l'Informatique, Paris, France

[21] Appl. No.: 932,007

[22] Filed: Aug. 8, 1978

[30] Foreign Application Priority Data

Aug. 11, 1977 [FR] France ........ 77 24782

[51] Int. Cl.[3] ........ G06F 3/14

[52] U.S. Cl. ........ 340/771; 340/801; 340/802

[58] Field of Search ........ 340/706, 771, 776, 799, 340/800, 801, 802, 803

[56] References Cited

U.S. PATENT DOCUMENTS

| | | | |
|---|---|---|---|
| 3,626,244 | 12/1971 | Holz | 340/771 |
| 3,832,693 | 8/1974 | Ishizaki et al. | 340/771 |
| 3,889,253 | 6/1975 | Ross | 340/799 |
| 3,891,982 | 6/1975 | Cheek et al. | 340/799 |
| 3,895,375 | 7/1975 | Williams | 340/801 |
| 3,938,137 | 2/1976 | Ngo et al. | 340/771 |
| 4,121,256 | 10/1978 | Lorteise et al. | 340/799 |

*Primary Examiner*—Marshall M. Curtis
*Attorney, Agent, or Firm*—Lowe, King, Price and Becker

[57] ABSTRACT

Information is displayed in alphanumeric form on a screen of a gas discharge tube having row and column electrodes with intersections. Gas in the tube is ionized in response to a predetermined ionizing voltage existing between the rows and columns at selected intersections to cause a visible signal to be derived at the intersections. Logic means applies ionizing voltages to column electrodes of the screen in a sequential scan. A video scan controller has one input responsive to signals representing coded characters to be displayed column by successive column. A character generator responsive to signals derived from the scan controller activates a controlled logic circuit so ionizing voltages are applied to predetermined row electrodes in the screen to activate the selected intersections to display the coded characters.

8 Claims, 2 Drawing Figures

SEQUENTIALLY SCANNED PLASMA DISPLAY FOR ALPHANUMERIC CHARACTERS

FIELD OF THE INVENTION

The present invention relates to a system for displaying information in alphanumeric form and more particularly to such a system wherein a plasma screen has columns and rows.

BACKGROUND OF THE INVENTION

One type of alphanumeric display systems converts binary data video signals representing alphanumeric information into video signals that enable the alphanumeric information to be displayed on a screen of a cathode ray tube. The systems generally include a character generator responsive to binary coded alphanumeric representing signals. In response to the binary coded signals there are derived further signals that produce a visual display of the alphanumeric symbols on the cathode ray tube screen. The generator is controlled by a timing clock which derives signals for controlling scanning of the tube and the character generator. The video signals representing the alphanumeric characters are supplied to the cathode ray tube at a rate corresponding to the rate the cathode ray tube uses the video signals and in synchronization with the video signals for controlling the scan.

With such systems it is not possible to obtain characters having the same definition as characters from segment generators or "monoscopes". Because of the character geometry, letters and figures of completely conventional shape cannot be obtained from a dot matrix which can be used for a large number of characters, unless the matrix is developed so that the dots thereof are very close together. However, close dot spacing requires substantial manufacturing cost, great complications at assembly, and exacting bandwidth requirements. Another drawback lies in the need to assign a part of a computer memory to regenerate the image.

Other character display systems employ a discharge tube, commonly termed a "plasma screen." In the plasma screen systems a gas is ionized to luminescence to display characters. The plasma tube generally contains a first glass plate which forms a back end of the tube and on which are situated a plurality of linear horizontal scanning electrodes. A second glass plate forms a front face of the tube that extends in a plane parallel to the first glass plate, and which carries a plurality of linear vertical scanning electrodes. A noble gas, such as neon, is contained in small cylindrical cells or enclosures, positioned between the plates, and having walls coated with phosphor. The enclosures are dotted with holes pierced in an insulating plate. On opposite sides of the insulating plate are the horizontal scanning electrodes (anodes) and the vertical scanning electrodes (cathodes) which enable points on the screen to be addressed. The horizontal scan electrodes cause a pre-discharge of ions in front of each cylindrical enclosure. If the anode is at a sufficiently high potential, the pre-discharge initiates an atomic neon discharge between the cathode and anode. As the neon atoms become ionized, they produce free electrons that are accelerated in each excited cell. The free electrons collide with other neon atoms, which are likewise ionized. A chain reaction is set off to cause a discharge that produces radiation both in the visible red spectrum and in the ultraviolet. In response to irradiation by the ultraviolet rays, a phosphor coating on the electrodes emits a beam of green light, whereby each excited cell emits red and green radiation having an intensity dependent upon the anode current. The magnitude of the anode current determines whether the emitted light is predominantly red or green.

The insulating plate provides capacitive coupling between the electrodes and the gas to provide each cell with memory properties. When a sufficient striking voltage is supplied to the terminals of a cell, the gas is ionized. The ionization persists for only a short time since electrostatic charges set up in the gas are subject to the applied field and cannot reach the electrodes outside the insulating plate of the cell. These charges attach to the enclosure walls, to establish a constant charge polarization, termed a memory voltage. The memory voltage opposes internal excitation to cut-off the ionization and light emission. The memory voltage can be used to re-excite the cell to a light emitting state by applying a maintaining voltage less than and of the opposite sign from a striking voltage.

Generally, in systems for displaying information on a plasma screen, it is necessary to have a character generator which controls both the anodes and the cathodes of the screen in such a way that characters can be formed by ionizing the gas at the intersections of predetermined anodes and cathodes or rows and columns. The character generator is therefore connected to logic circuits for addressing rows and columns. The columns are divided into character columns, one of which is provided for each column of characters; each character column is further divided into plural fundamental columns. The logic circuits are often complicated and frequently include a large number of counters, thereby being difficult to construct. Such systems also are deficient in speed, chiefly because of the time taken to address the rows and columns.

An object of the invention is to provide a new and improved system for displaying information in alphanumeric form on a screen of a gas discharge tube.

Other objects of the present invention are to simplify the addressing of the rows and columns which are selected for the display of characters, and to increase the speed of a gas discharge tube alphanumeric display.

BRIEF DESCRIPTION OF THE INVENTION

The system of the present invention includes logic means which can be controlled to apply ionizing voltages to predetermined rows of a screen of a gas discharge tube alphanumeric display, and to apply ionizing voltages to the columns of the screen in a regular scan. A character generator is connected to the controllable logic means, in turn controlled by a video scan controller having one input responsive to signals representing coded characters to be displayed column by successive column, i.e., sequentially in the character columns.

In accordance with another feature of the invention, a video scan controller is connected to a read/write memory of a computer via a read/write circuit. The read/write memory stores signals relating to the coded characters to be displayed. The read/write circuit is arranged so that the coded characters, which are recorded row by successive row in the memory, are read out and reach the video scan controller column by successive column.

The above and still further objects, features and advantages of the present invention will become apparent upon consideration of the following detailed description of a specific embodiment thereof, especially when taken in conjunction with the accompanying drawing.

DETAILED DESCRIPTION OF THE DRAWING

Figure 1:
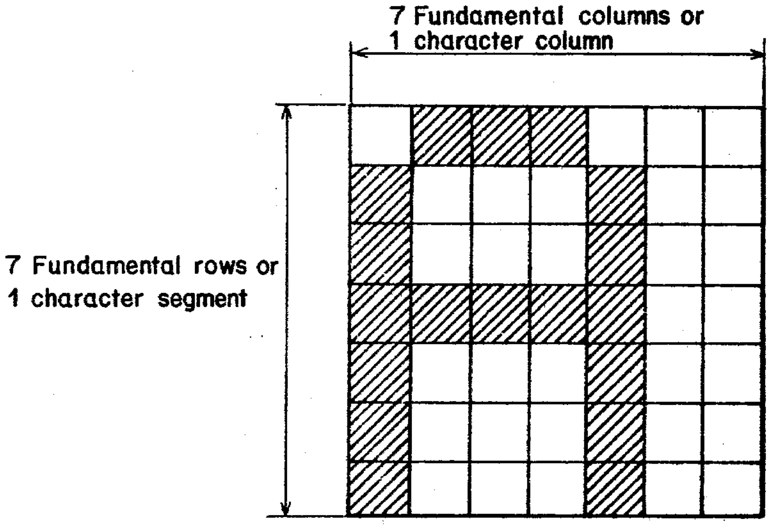
FIG. 1 is a drawing of a character obtained on a display screen of the system.

Reference is made to FIG. 1, where a character, the letter A, formed in a matrix of 7×5 dots, is illustrated on a plasma screen of a display system. Seven fundamental rows of the display define one character segment and seven fundamental columns of the display define one character column. An entire character can thus be displayed by intersections between one character segment and one character column. In the preferred embodiment of the invention, 40 character columns and 12 character segments can be traced out on the plasma screen, thus providing a display of 480 characters. Such a plasma screen thus has 84 fundamental rows and 280 fundamental columns.

Figure 2:
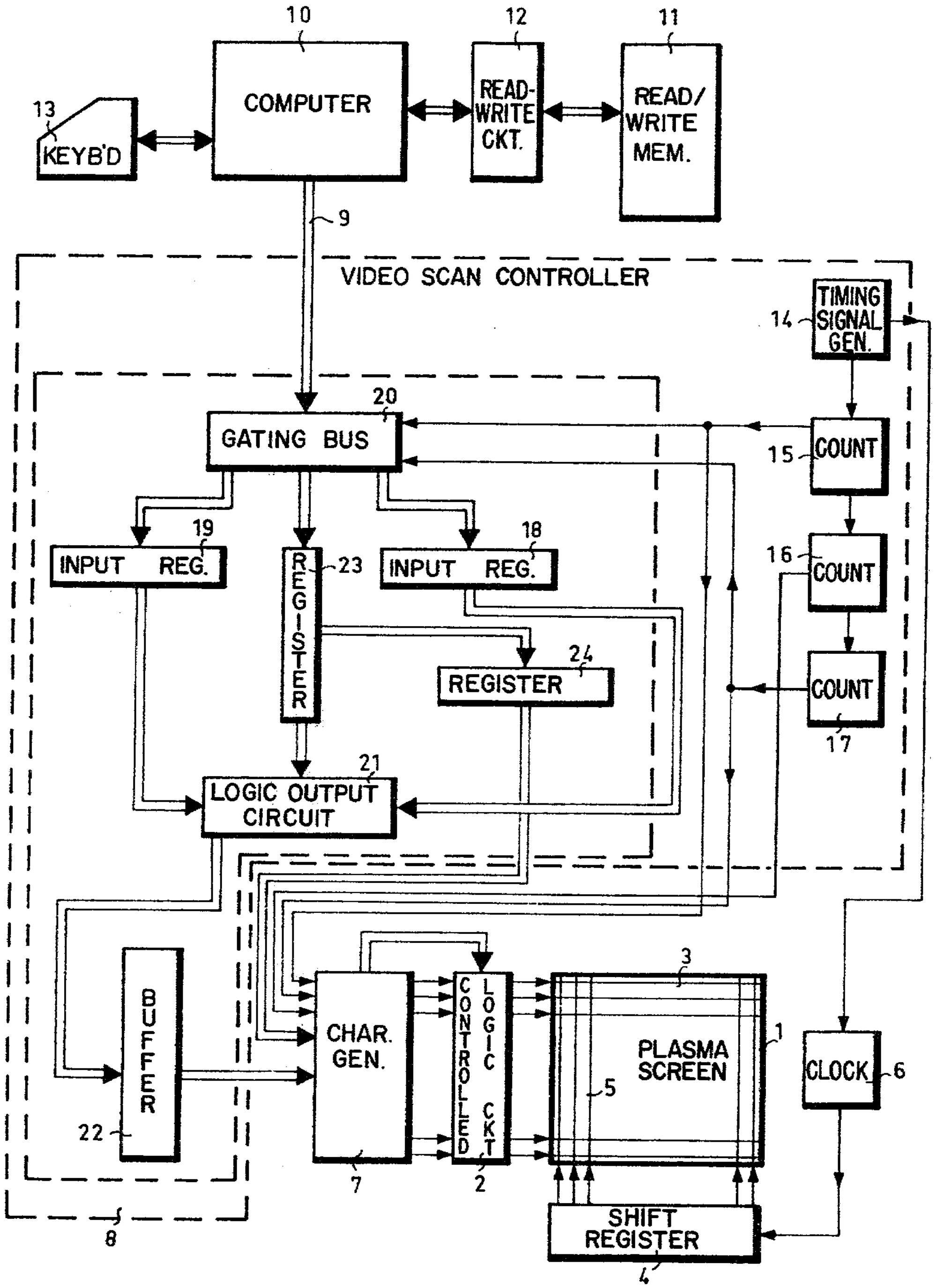
FIG. 2 is a block diagram showing a preferred embodiment of the invention.

Referring to FIG. 2, the display system of the invention includes a "plasma screen" discharge tube 1. As known to those skilled in the art, the 84 fundamental rows 3 of the screen of tube 1 are selectively ionized by controllable address logic circuit 2 which includes, for each row, a bilevel output amplifier. Which of rows 3 is to be ionized is determined by the characters to be displayed on the screen of tube 1. The 280 fundamental columns 5 of the screen are swept in sequence periodically in response to outputs at successive taps of a conventional shift register type logic circuit 4. Circuit 4 is driven by, and at a rate determined by, pulses derived from clock 6. Circuit 4 includes, for each of the fundamental columns 5, a separate amplifier which enables suitable ionizing voltages to be applied to the columns.

Controllable logic circuit 2 is controlled by a character generator 7, driven by a video scan controller 8 having an input bus 9 responsive to a parallel multi-bit, coded conventional output (such as ASCII) of computer 10. The coded characters are to be displayed column by successive column on the plasma screen of tube 1.

Character generator 7 receives binary signals relating to the characters in each column. In response to each signal from counter 17, which occurs once for each complete row of displayed characters, generator 7 feeds these signals to a shift register (not shown) contained in logic circuit 2 for the scan of the rows of the screen. The signal values indicate which of the rows 3 are to be supplied with an ionizing voltage whereby ionization occurs at the intersections between these rows and the fundamental column 5 which is simultaneously energized by an output of circuit 4. The ionization produces spots of light that represent the portions of characters appropriate to one of the fundamental columns used to display the characters in a column.

Video scan controller 8 includes a timing signal generator 14 which drives clock 6 and cascaded counters 15, 16 and 17 which are arranged so the last stages of counters 15 and 16 respectively drive the first stages of counters 16 and 17. Counters 15 and 17 control gating bus 20 which alternately feeds signals for alternately numbered columns of tube 1 from input 9 to buffer registers 18 and 19. While one of registers 18 or 19 is being loaded with signals relating to one character column, the other register is deriving a multi-bit signal that is supplied to character generator 7.

The count in counter 15 signifies the number of each fundamental column in each character; the count in counter 16 specifies the character count within a row; and the count in counter 17 signifies the number of columns of complete characters which have been traced out, i.e. the number of rows. Gating circuit 21, responsive to the parallel multi-bit outputs of registers 19 and 20, feeds signals from a completely filled one of input registers 18 or 19 to a buffer register 22. The signals in buffer register 22 contain all the information relating to the characters in a column; for each character, register 22 stores a signal indicating the row to which the character belongs in the column in question. Buffer 22 includes a parallel multi-bit output that simultaneously feeds all of the ASCII code bits for one character to generator 7. Generator 7 responds to each successive column signal supplied to bus 9 and converts it into binary signals for each of the seven fundamental rows forming the successive seven fundamental columns of each character. All of the bits for the seven rows forming the first fundamental column of the first character are fed from character generator 7 to circuit 2 in response to the first pulse from counter 15. These bits are fed in parallel from generator 7 to inputs of a seven stage buffer (one for each fundamental row) of circuit 2 and are then read out simultaneously from the buffer to the seven elementary rows of a character. All of the bits for the same seven fundamental rows of the second fundamental column of the first character are fed from generator 7 to circuit 2 in response to the second pulse from counter 15. While the first and second pulses from counter 15 are being supplied to generator 7, clock source 6 is activating circuit 4 to cause corresponding ones of columns 5 to be energized. Seven pulses are supplied in this way by counter 15 to read all of the fundamental columns of a character from generator 7 through circuit 2 into the seven fundamental rows for one row of tube 1. Then, under the control of a pulse from counter 16, the next character is decoded by character generator 7 into seven fundamental columns, each including seven fundamental rows and these signals are applied to the seven fundamental rows for a single character. After a complete column of characters has been decoded by character generator 7, the character generator is advanced to the next row of characters in response to an output pulse of counter 17.

Signals relating to the coded characters to be displayed are stored in computer read/write memory 11, connected to the computer 10 via a read/write circuit 12. Memory 11 and circuit 12 are arranged so coded character representing signals are stored row by row in memory 11 and are read out by circuit 12 and supplied to input bus 9 of video scan controller 8 column by successive column. In effect, an operator punches out a text on keyboard 13 as successive rows of characters which are coded row by row before being stored in memory 11. The technical nature of the plasma screen of tube 1 is such that columns 4 are scanned in a regular rhythm. Thus, character text can appear on the screen of tube 1 only column by successive column. The first character is traced on the screen at the bottom of the first fundamental column and continues in an upward direction until all of the fundamental rows of the first fundamental column have been traced, after which the second fundamental character is traced from the bottom. The process continues until all of the columns have been traced, after which the scan returns to the bottom of the first column and is repeated.

Special instructions regarding the manner in which characters are to be displayed on the screen of tube 1 are fed from input 9 through gating circuits 20 to cascaded registers 23, 24, each having parallel, multi-bit inputs and outputs, whereby the multi-bit output of register 23 is supplied to register 24 and register 23 can be responsive to an additional special instruction. The parallel multi-bit output of register 23 is selectively coupled through circuit 21 and buffer 22 to character generator 7. The signal in register 24 is read out directly into character generator 7. Character generator 7 is also responsive to periodic signals derived from counters 15, 16 and 17 so that the signal in buffer 22 is gated to the character generator each time a signal is derived from counter 17. The special information relates, e.g. to the addresses of one or more predetermined characters to be displayed or to a particular method of displaying these predetermined characters. The particular display method may, for example, (1) cause one or more characters to wink repeatedly on the screen, or (2) move a traced out cursor on the screen. The special information may also relate to activation instructions for logic circuit 2 to scan the screen tube 1 so there is a one unit shift in the column scanning order of the screen to provide increased character definition.

The described system enables the previously mentioned objects to be achieved; in particular the system provides simplified addressing of rows and columns and increased speed of character display.

While there has been described and illustrated one specific embodiment of the invention, it will be clear that variations in the detail of the embodiment specifically illustrated and described may be made without departing from the true spirit and scope of the invention as defined in the appended claims.

I claim:

1. A system for displaying information in alphanumeric form on a screen of a gas discharge tube having row and column electrodes with intersections, the gas being ionized in response to a predetermined ionizing voltage existing between the rows and columns at selected intersections to cause a visible signal to be derived at the intersections, comprising (a) logic means for applying ionizing voltages to column electrodes of the screen in a sequential scan, (b) a video scan controller having one input responsive to signals representing coded characters to be displayed in sequential character columns, (c) a character generator responsive to signals derived from said video scan controller, and (d) controlled logic means responsive to signals derived from the character generator for applying ionizing voltages to a predetermined group of row electrodes of the screen, to activate the selected intersections to display the coded characters, said predetermined group of row electrodes corresponding to a character row.

2. The system of claim 1 wherein the video scan controller is responsive to a read/write memory of a computer via a read/write circuit, the read/write memory storing signals representing the coded characters to be displayed, the read/write circuit being arranged so that the coded characters, which are in strict row by successive row in the memory, are read out and fed to the video scan controller in sequential character columns.

3. The system of claim 2 wherein the video scan controller includes a timing signal generator comprising counters and storage means for supplying the character generator signals indicative of the characters to be sequentially displayed in the character column.

4. The system of claim 3 wherein each character in a character column is formed by the intersections between a predetermined number of fundamental columns and rows, the counters included in the timing signal generator comprising a first counter for indicating the serial number of each character in a character column, a second counter for indicating the number of each fundamental character column in each column, and a third counter for indicating the number of each character column.

5. The system of claim 4 wherein the storage means includes two identical input registers alternately responsive to two sets of signals relating to successive character columns characters to be displayed, a logic input circuit connected to the computer and to the timing signal generator for controlling the alternate filling of the two input registers so one of the registers is filling while the other register is emptying, and a logic output circuit for controlling the transmission of information from a completely filled input register to a buffer register connected to the character generator.

6. The system of claim 5 wherein the storage means includes at least one special instruction register responsive to the output of the logic input circuit to receive signals indicative of the address of at least one predetermined character to be displayed in a special fashion and a special manner in which the predetermined characters are to be displayed.

7. In combination, a computer having a read/write memory for storing binary signals representing alphanumeric characters, a gas discharge tube having row and column electrodes with intersections on a visual display screen, the gas being ionized in response to a predetermined ionizing voltage existing between the rows and columns at selected intersections, a timing signal generator, logic means responsive to the timing signal generator for applying ionizing voltages to column electrodes of the screen in a sequential scan, a video scan controller having one input responsive to signals read from the memory and representing characters to be displayed in sequential character columns, a character generator responsive to signals derived from said video scan controller, and controlled logic means responsive to signals derived from the character generator for applying ionizing voltages to a predetermined group of row electrodes of the screen, to activate the selected intersections to display the coded characters, said predetermined group of row electrodes corresponding to a character row.

8. The combination of claim 7 wherein the character representing signals are stored in the memory in row by row arrangement and the computer includes a read/-write circuit responsive to the character representing signals stored in the memory, the read-write circuit including means for translating the stored row by row arrangement into a column by column arrangement and for feeding the video scan controller with the character representing signals in sequential character columns.

* * * * *